C. BECKMANN.
EXPLOSION TURBINE.
APPLICATION FILED DEC. 19, 1905.

903,657.

Patented Nov. 10, 1908.
5 SHEETS—SHEET 1.

WITNESSES:

INVENTOR
Carl Beckmann
BY
ATTORNEYS

C. BECKMANN.
EXPLOSION TURBINE.
APPLICATION FILED DEC. 19, 1905.

903,657.

Patented Nov. 10, 1908.
5 SHEETS—SHEET 2.

WITNESSES:

INVENTOR
Carl Beckmann
BY
ATTORNEYS

C. BECKMANN.
EXPLOSION TURBINE.
APPLICATION FILED DEC. 19, 1905.

903,657.

Patented Nov. 10, 1908.
5 SHEETS—SHEET 3.

WITNESSES:
J. A. Brophy
F. O. Ammen

INVENTOR
Carl Beckmann
BY
ATTORNEYS

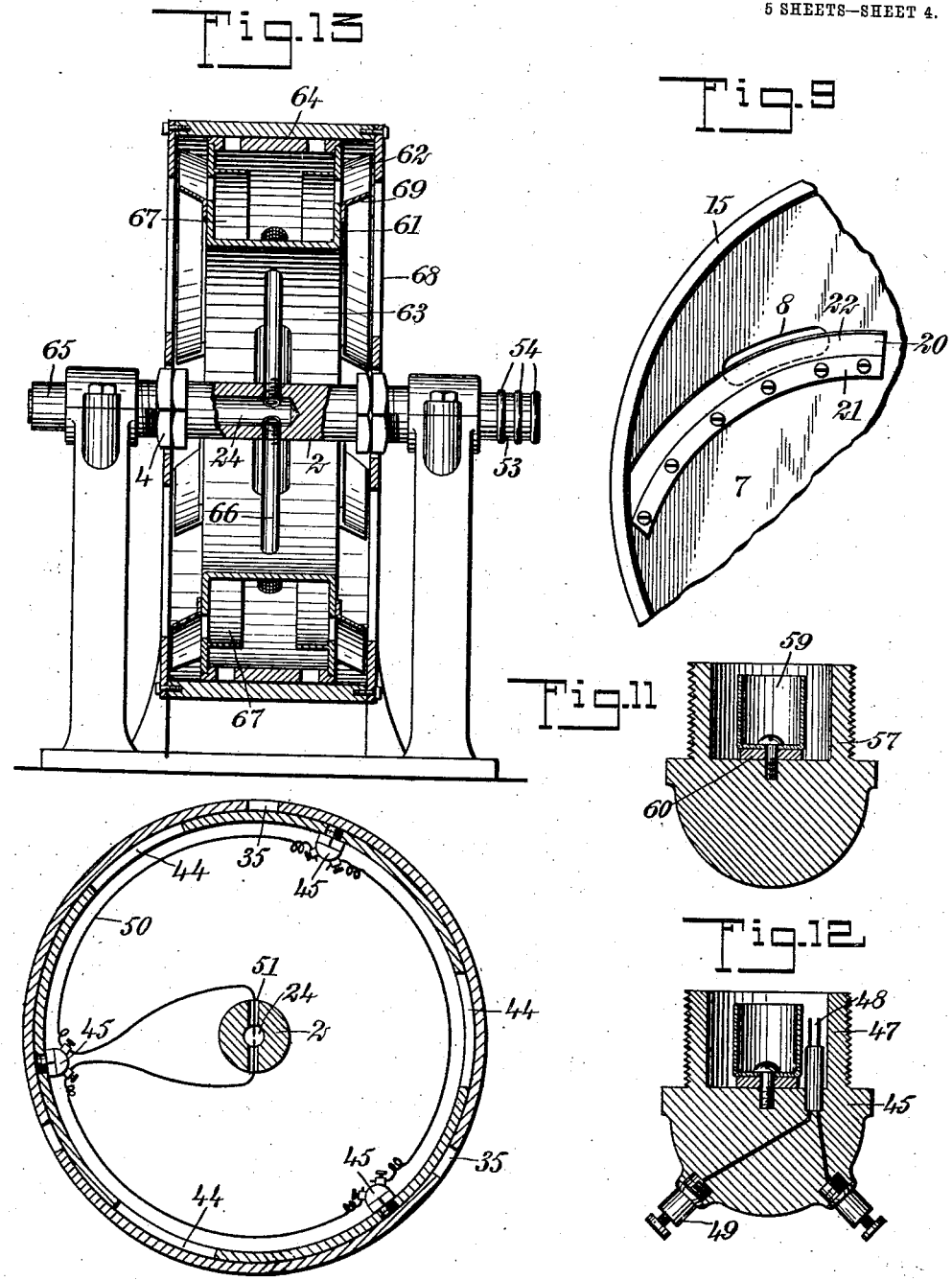

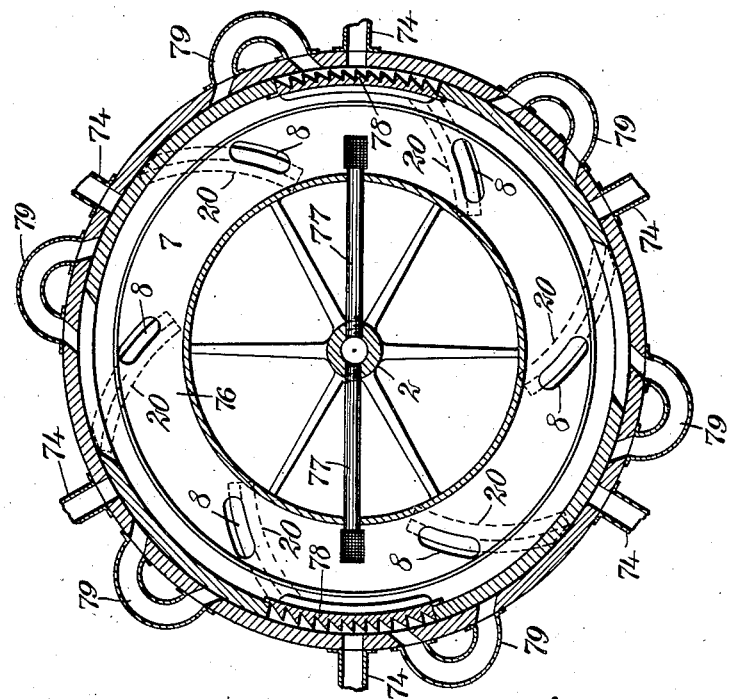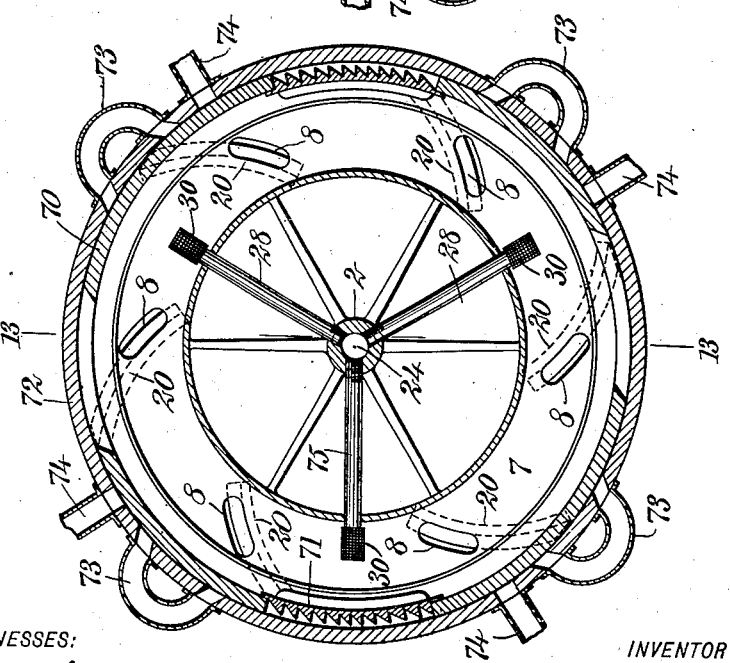

UNITED STATES PATENT OFFICE.

CARL BECKMANN, OF NEW YORK, N. Y.

EXPLOSION-TURBINE.

No. 903,657.

Specification of Letters Patent.

Patented Nov. 10, 1908.

Application filed December 19, 1905. Serial No. 292,519.

*To all whom it may concern:*

Be it known that I, CARL BECKMANN, a citizen of the United States, and a resident of the city of New York, borough of Brooklyn, in the county of Kings and State of New York, have invented a new and Improved Explosion-Turbine, of which the following is a full, clear, and exact description.

This invention relates to explosion turbines.

The object of the invention is to produce a prime mover of this class which is simple in construction and efficient in operation.

Further objects of the invention are to provide an arrangement which will enable the rotor of the machine to act as a carbureter, to provide improved means for feeding the charges to the explosion chambers, and to provide improved means for igniting the same.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
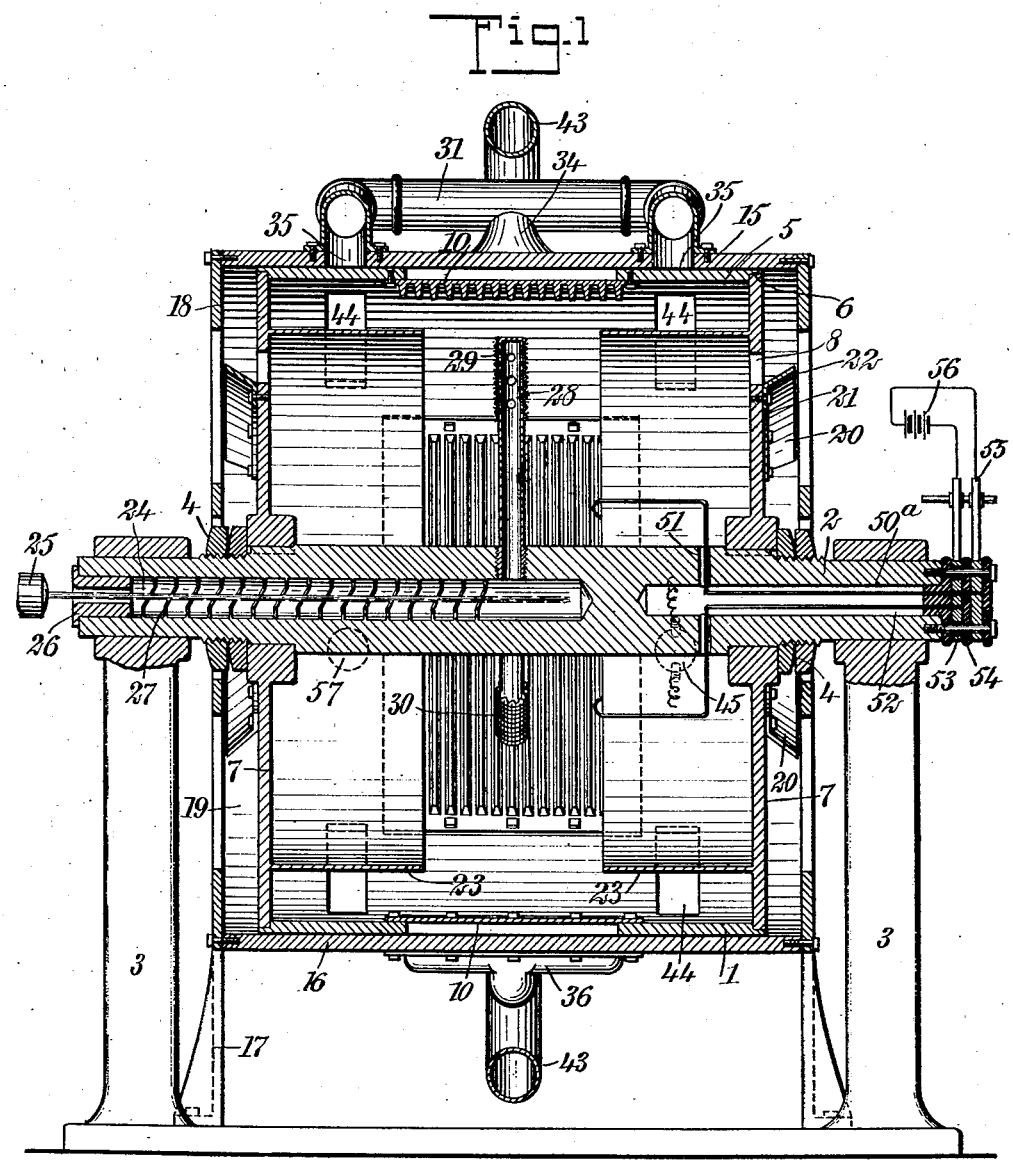
Figure 2:
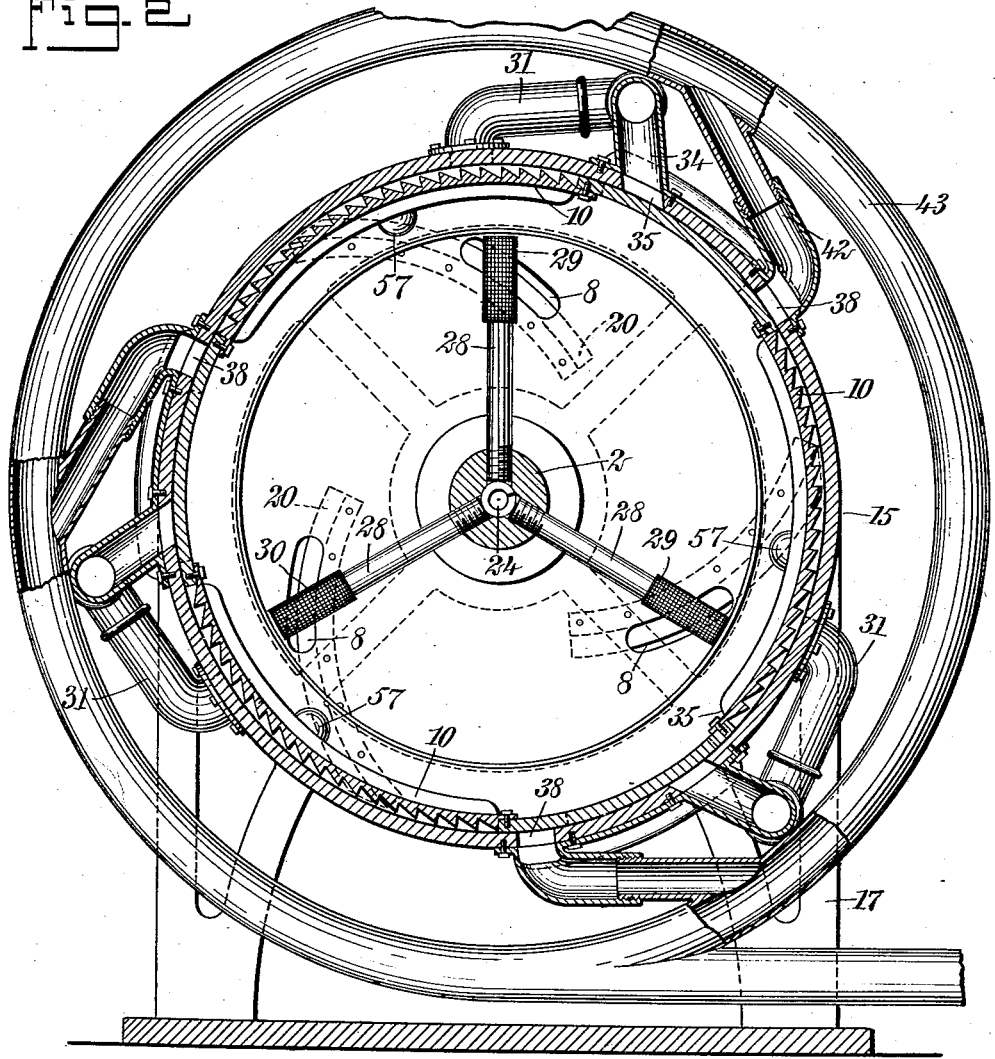
Figure 8:
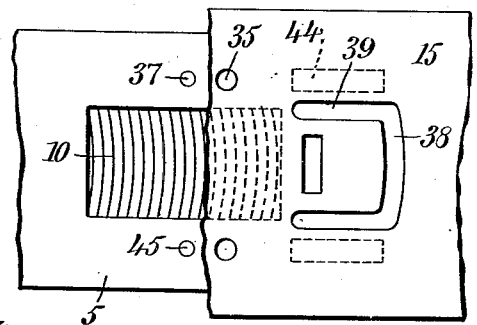
Figure 3:
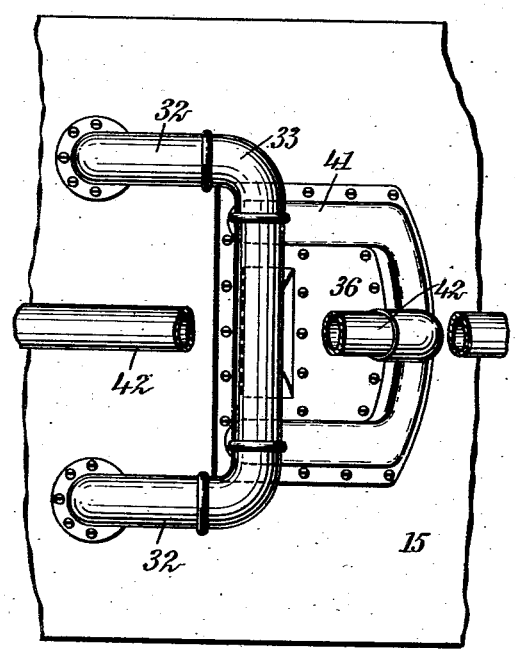
Figure 4:
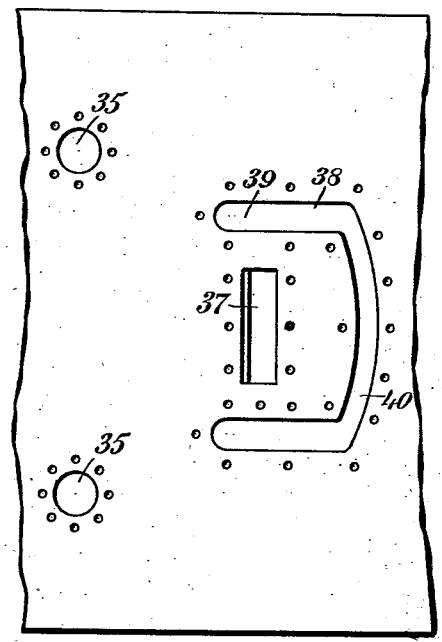
Figure 5:
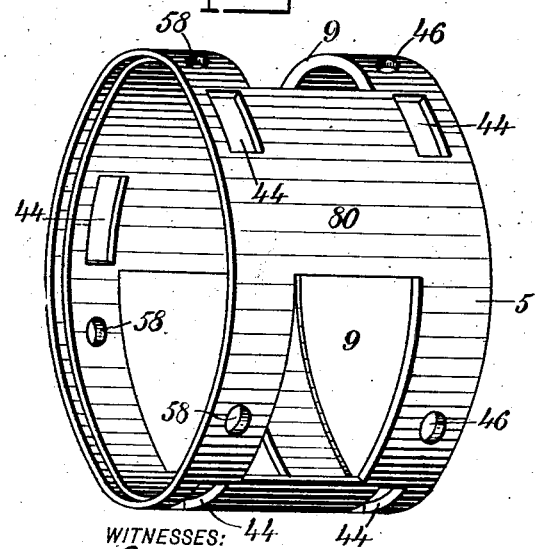
Figure 6:
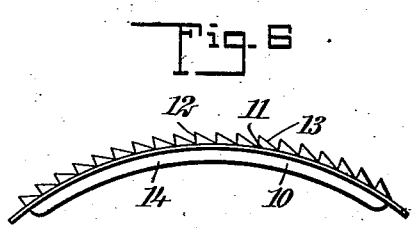
Figure 7:
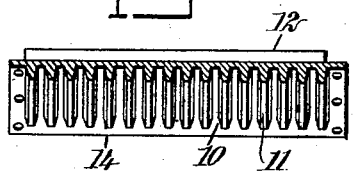

Figure 1 is a longitudinal vertical section through a turbine constructed according to my invention; Fig. 2 is a central transverse section, certain parts being broken away and others shown in elevation; Fig. 3 is a plan of a portion of the stator, to illustrate the piping arrangement; Fig. 4 is a plan similar to Fig. 3, showing a portion of the stator with the piping removed, so as to illustrate the port arrangement of the stator; Fig. 5 is a perspective of the shell of the rotor; Fig. 6 is a side elevation of a bucket section; Fig. 7 is a transverse section through the bucket section shown in Fig. 6; Fig. 8 is a plan showing a portion of the rotor and a portion of the stator superposed thereupon, so as to illustrate the mode of operation of the buckets in receiving the force of the explosion and in discharging the gases of combustion through the exhaust ports of the rotor; Fig. 9 is an end elevation of a portion of the turbine, showing the head thereof removed so as to illustrate the air feed; Fig. 10 is a cross section through the rotor and stator, illustrating the circuit arrangement for igniting the charges electrically; Fig. 11 is a cross section through an ignition plug which is used in connection with the turbine; Fig. 12 is a cross section through an ignition plug showing the type used with the electrical ignition devices; Fig. 13 is a vertical cross section through a modified form of the turbine; this view is taken on the line 13—13 of Fig. 14; Fig. 14 is a transverse section through the turbine shown in Fig. 13; in this view the rotor and stator only are illustrated; and Fig. 15 is a cross section similar to Fig. 14 but showing another modified construction the turbine may assume.

Referring more particularly to the parts, 1 represents the rotor of the turbine, the same being rigidly mounted upon a shaft 2, which shaft is rotatably mounted in suitable pedestal bearings 3. The rotor may be rigidly attached to the shaft in any suitable manner, such as by means of nuts 4, as shown. The rotor comprises a shell 5, of substantially cylindrical form which is preferably rabbeted at its extremities 6 so as to receive rotor heads 7. These heads are of simple disk form and provided with a plurality of air inlet openings 8, as shown in Fig. 9, the said inlets being preferably in the form of slots near the edges of the heads; these slots are preferably inclined as shown. The construction of these heads 7 will be described more fully hereinafter.

The shell 5 of the rotor is illustrated very clearly in Fig. 5; it is formed with a plurality of openings 9, facilitating the attachment of detachable bucket sections 10; in the openings 9 the bucket sections 10 are attached in any suitable manner. These bucket sections are curved so as to conform to the curvature of the shell and are formed with transverse projections or teeth 11 on their outer faces, said teeth presenting abrupt rear faces 12 and inclined forward faces 13. On the inner side of the bucket sections, radiator ribs 14 are formed, which preferably extend longitudinally of the buckets; that is, they extend circumferentially of the rotor.

The rotor 1 is mounted within a stator 15, which stator comprises a cylinder or barrel 16 supported upon standard 17, as shown, the upper portion of said standards 17 being formed into annular heads 18 which are attached rigidly to the extremities of the barrel, as indicated. The rotor is of considerably less length than the stator, and disposed centrally within the same so that air spaces 19 are formed between the rotor heads and the stator heads. To the outer faces of the heads 7, vanes 20 are attached, which consist of blades, as illustrated most clearly in Fig. 9. These blades are preferably formed of angle iron or similar material, presenting webs 21 which attach to the heads, and flanges 22 which project outwardly in an inclined position. As viewed in end elevation, these vanes are preferably curved as indicated in Fig. 9, so that they conform substantially to the inclination of the inlet slots 8 referred to above. It should be understood that the flanges 22 are disposed forwardly with respect to the direction of rotation.

It should be understood that in practice, there may be as many of the bucket sections 10 as desired; I have illustrated three. It should be understood that the rotor is mounted so as to rotate freely within the stator, with its outer face lying substantially against the inner face of the stator. It should be understood, also, that the rotor constitutes a carbureter, air being supplied to the interior thereof by means of the vanes 20. In this connection, it should be understood that as the rotor revolves, the vanes operating in the air spaces 19, induce an influx of air which passes into the rotor through the openings 8. In order to direct this incoming air toward the central portion of the rotor, I provide the inner face of the heads 7 with guard sleeves or flanges 23 which are of substantially cylindrical form and extend a short distance longitudinally with the axis of the turbine.

In order to introduce the fuel conveniently in a liquid state, I provide one extremity of the shaft 2 with a bore 24, and I inject the fuel into the open extremity of this port by means of a suitable injector 25. In the port in the end of the shaft, I prefer to place a bushing 26 which assists in preventing a back flow of the fuel. This action is also prevented by means of a helical fin 27, or screw which is formed on the inner face of the bore as indicated. The character of this screw, of course, depends upon the direction of rotation, and is opposite in character to the same, so that the fin will exert a tendency to force the fuel inwardly. Near the inner extremity of the bore 24, I attach tubular arms 28 which project radially as shown. These arms constitute gasifiers; they communicate with the bore 24 so as to receive fuel therefrom. Preferably at their outer extremities, they are provided with perforations 29 and their extremities are closed. The perforations 29 are covered by a sleeve 30 preferably of wire gauze or similar material. From this arrangement it should be understood that the fuel will pass by centrifugal force into the gasifier arms and will pass on to the sleeves 30 where the evaporation of the fuel is greatly enhanced by the large superficial area presented by the wires composing the sleeves 30. By reason of the air heads, it will now be understood that two incoming streams of air are directed upon these gasifiers so that the interior of the rotor becomes an efficient carbureter.

Upon the outer side of the stator, I provide explosion chambers 31. These are preferably three in number, as illustrated in Fig. 2. These explosion chambers are preferably constructed of suitable piping, comprising oppositely disposed branches 32 which connect by means of suitable elbows 33 with a main tee-connection 34. The branch connections 32 are attached over inlet ports 35 as illustrated most clearly in Figs. 3 and 4. These inlet ports are of substantially circular form. The connections 34 are preferably inclined rearwardly with respect to the direction of rotation, as illustrated most clearly in Fig. 2, and these connections 34 constitute parts of bonnets 36, the bodies of which constitute flat dished plates as shown. The connections 34 are attached directly over explosion ports 37. These explosion ports 37 are preferably disposed centrally as indicated in Fig. 4, there being one in connection with each pair of inlet ports 35. Near each of the explosion ports 37, I provide an exhaust port 38. These exhaust ports are formed as indicated in Fig. 4, presenting branches 39 near the ends of the explosion ports 37, and these branches extend longitudinally with respect to the direction of rotation of the rotor. At adjacent extremities and on their forward ends with respect to the direction of rotation, the branches 39 are connected by a curved slot 40, as shown. In this connection, it should be understood that the curvature of these slots is such that they present their convex sides toward the direction in which the rotor revolves. The bonnets 36 are attached in any suitable manner to the outer face of the stator, and these bonnets are formed with ducts or channels 41 which overlie the exhaust ports 38 and afford means for conducting the gases of combustion through pipe connections 42. These pipe connections are preferably inclined as shown, in a reverse direction with respect to the direction of rotation of the rotor, and lead into a main or exhaust ring 43. It should be observed that the explosion ports 37 are substantially rectangular in form, being disposed longitudinally with respect to the axis of the rotor. The side edges of these ports are preferably beveled, as indicated, so that gases flowing through the same will be directed in the direction in which the face of the rotor is moving.

I provide means for admitting the explosive mixture formed within the carbureter, into the explosion chambers; for this purpose, I provide the rotor shell 5 with a plurality of inlet ports 44. These are substantially rectangular in form, extending circumferentially of the rotor. They are disposed in pairs, the members of which are oppositely located as shown. There are three of these pairs of ports and these ports aline with the inlet ports 35 of the explosion chambers. It should be understood that when the rotor revolves, these ports afford passage for the explosive mixture. In this connection, it should be understood that the constant inflow of air into the rotor at the heads operates to bring about a slight pressure within the rotor so that the explosive mixture quickly passes into the explosion chambers when opening is made thereto. From this arrangement, it will be understood that, as the rotor revolves, whenever one of the inlet ports 44 passes under its corresponding explosion chamber, a charge will pass from the carbureter or rotor into the explosion chamber. It should be understood, further, that the buckets 10 are in substantial alinement with the explosion ports 37 and exhaust ports 38, as indicated most clearly in Fig. 8. As the buckets are passing under the explosion ports, the charges in the explosion ports are ignited and the force of the explosion is received upon the buckets, tending to rotate the rotor, as will be readily understood. These buckets are preferably curved on their outer faces as indicated, so that they belong to the "impinge and reaction" type.

I provide means for igniting the charges in the explosion chambers at all the inlet openings 35; in order to do this, I provide ignition plugs 45, constructed as illustrated in Fig. 12, and these are attached in suitable openings 46 in the shell 5 of the rotor. Each of these plugs comprises a tubular body 47, in the bore whereof there is attached an electric sparker 48, such as a jump spark device, the terminals whereof are attached to binding posts 49; these binding posts are connected in series in a circuit 50, and the conductors 50ᵃ of this circuit pass out into the interior of the rotor through openings 51 formed in the shaft 2 and lead from a bore 52 formed in the end of the shaft opposite to the point of injection of the fuel. The conductors 50 attach to suitable collars 53 which are separated by insulating disks 54 and insulated from the shaft. Upon the faces of these collars 53, suitable brushes 55 are arranged, to which attach the conductors leading from a suitable battery 56. From this arrangement, it should be understood that when the plugs 45 are passing the ports 35, ignition of the charges within the explosion chambers 31, will take place. It should be understood that I do not use these electrical igniting devices on both ends of the turbine, but only on one end; on the opposite end I use ignition plugs 57, such as illustrated in Fig. 11. The bodies of these plugs are substantially similar to the bodies of the plugs 45, but they are not provided with electrical igniting devices. These plugs 57 are attached in suitable openings 58 in the shell 5 of the rotor, and these openings lie opposite the openings 46 aforesaid, so that the ignition devices are passing both openings of the explosion chambers simultaneously. Within the tubular bodies of the plugs 45 and 57 I provide porcelain cups 59 which are attached to the plugs upon suitable washers 60 of asbestos or similar material. In the operation of the turbine it should be understood that the explosions take place at a high rate, so that these porcelain cups will acquire a high temperature. They are intended to act as ignition devices after the turbine has been operating a sufficient time. The sparking devices 48 are intended to be used for starting the machine.

While I prefer to have the same number of bucket sections as explosion chambers, this arrangement is not by any means a necessity, as will appear more fully hereinafter. Furthermore, instead of making the body of the rotor of a simple cylindrical shell as described above, I may give the rotor 61 the form shown in Fig. 13. In this instance, the body of the rotor is annular, the head 62 thereof being formed integrally with an inner sleeve 63. To the head 62 the shell 64 of the rotor is attached, as indicated. In other respects, the construction of this type is substantially the same as that described, comprising a hollow shaft 65 having radially disposed gasifiers 66 which lead into the annular chamber 67 formed in the interior of the rotor. As before, I provide air heads 68 on the stator which enable the vanes 69 to draw air into the interior of the rotor. In Fig. 14 I have illustrated a turbine of this second type in which the rotor 70 is provided with two bucket sections 71, while the stator 72 is provided with four explosion chambers located near exhaust outlets 74. In this instance I employ three gasifiers 75. I may, however, adopt the construction shown in Fig. 15, which is another modification of this second type. In this instance I provide an annular rotor 76 with gasifier arms 77 and two bucket sections 78. Instead of providing four explosion chambers as shown in Fig. 14, I may provide six explosion chambers 79. It should be understood that the operation of the device is substantially the same with the different types illustrated, except that where the explosion chambers are increased, the number of explosions per revolution are, of course, increased also.

The mode of operation of the turbine will now be described, referring especially to the illustrations showing the preferred form. The manner of introducing the fuel into the interior of the rotor and mixing the same with the air therein, will be clearly understood from the foregoing description. As the rotor revolves, when the inlet ports 44 pass under the ports 35 of the stator, explosive charges pass through into the explosion chambers 31. The explosion takes place when the buckets are disposed under the explosion ports 37; from an inspection of Fig. 8, it will appear that the central portion of the buckets will be passing under the explosion ports 37 when the side edges of the buckets are passing under the branches 39 of the exhaust ports 38. As the explosion occurs, a violent rotative force is exerted upon the buckets of the rotor, and the gases of combustion pass longitudinally in both directions along the buckets from the central portion thereof. In this way they pass to the branches 39 of the exhaust ports. Exhausting rearwardly in this manner, they exert a reactive effect upon the buckets so that the buckets utilize not only the direct force of the explosion, but also receive a certain momentum by reason of the rearward direction in which the gases expel themselves from the same. Attention is called to the fact that the explosion ports 37 and the exhaust ports 38 are arranged so that the buckets reach both of these ports simultaneously. In this way, exhaust begins at the exhaust ports 38 as soon as admission to the buckets begins from the explosion chambers. Between the buckets 10, the rotor shell 5 presents blank faces 80 toward the stator, and as these faces lie very close to the face of the stator they operate substantially to prevent escape of gases therebetween. In addition to their function of providing air for the turbine, the vanes 20 have another function, which consists in constantly throwing back the gases of combustion which tend to escape longitudinally of the rotor, so as to pass into the air spaces 19. In this connection it should be observed that the extremities of the vanes 20 extend outwardly so that they lie adjacent to the inner face of the overhanging ends of the rotor shell, projecting under the annular heads 18. In this way the vanes operate as scoops to draw in the gases of combustion through the openings 8, together with the fresh air necessary to supply the oxygen for the combustion.

It will be understood from the above that the interior of the rotor constitutes a carbureting chamber; at the same time, the large volume of air passing into the rotor assists in keeping its temperature from rising too high. The velocity of the rotor is high so that the explosions occur in rapid succession. In this way the edges of the buckets rise to a temperature which is sufficiently high to ignite the charges in the explosion chambers as they pass them. Hence as the buckets are passing, the charges are ignited at two points; that is, by the two ignition devices or porcelain cups 59 and also by the buckets. The port arrangement is such that the fresh charge begins its admission before the exhaust of the exploded charge is complete; hence the incoming charge assists in expelling the gases of combusion from the explosion chambers. In one aspect the overhanging ends of the stator may be considered as hoods; the air spaces 19 then will constitute gas-traps for any gases tending to escape laterally between the stator and the rotor. Any suitable hydrocarbon fuel will be used.

It is advantageous to have the charging openings of the rotor in the curved side face thereof, as the centrifugal force then assists in moving the charge into the explosion chamber.

While the vanes 20 operate to turn the escaping gases of combustion, they have a further useful function by increasing the pressure within the rotor, and this facilitates the feeding movement of the charges from the rotor into the explosion chambers.

Having thus described my invention, I claim as new and desire to secure by Letters Patent;

1. In an explosion turbine, in combination, a rotor, a stator having an explosion chamber with an inlet opening adjacent to said stator, said rotor having a carbureting chamber therein and having an inlet port in alinement with said opening, said stator having an explosion port leading from said chamber, said rotor having buckets to receive the force of the explosion and ignition devices carried by said rotor and alining with said inlet port and said explosion port.

2. In an explosion turbine, in combination, a stator having a plurality of explosion chambers, a rotor mounted therein and constituting a carbureter, means for admitting air and a gaseous fuel to said rotor, said rotor having openings in the wall thereof which may communicate with said explosion chamber to admit charges thereto, buckets carried by said rotor and adapted to receive the force of the explosion from said chambers, and a self-igniting plug carried by said rotor, said explosion chambers having openings alining substantially with said plug and said buckets.

3. In an explosion turbine, in combination, a rotor having a shaft with a longitudinal bore therein, said bore communicating with the interior of said rotor, means for injecting a liquid fuel into said bore, a conveyer-screw mounted in said bore and adapted to feed inwardly toward said rotor, a stator having explosion chambers, said rotor having openings which may communicate with said explosion chambers to admit gas thereto, and buckets carried by said rotor, which may communicate with said explosion chambers to receive the gases therefrom.

4. In an explosion turbine, in combination, a stator having a round body, a rotor carbureter mounted therein and substantially filling the bore of said body, bucket sections carried by said rotor, explosion chambers on said stator adapted to exert the force of the explosion on said bucket sections, hoods projecting outwardly at the ends of said stator adapted to trap the gases passing therefrom, and vanes for forcing said gases back into said rotor.

5. In a turbine, in combination, a stator, a rotor mounted therein and having side walls, said stator having explosion chambers, gas traps formed at the ends of said stator beyond said side walls, and rotating vanes outside of said walls at the ends of said stator, for forcing the gases from said traps back into said rotor.

6. In a turbine, in combination, a rotor, a stator surrounding the same and projecting therebeyond at the sides to form hoods, said rotor having heads with inlet openings therein and vanes carried by said heads and moving in said hoods to throw the gases inwardly.

7. In a turbine, in combination, a rotor having transverse bucket grooves inclining rearwardly toward the side edges thereof, a stator having ports alining with substantially the middle portions of said buckets, and having exhaust ports with branches leading rearwardly and alining with the side edges of said buckets.

8. A stator, a hollow rotor mounted therein, said stator having explosion chambers receiving the explosive mixture from said rotor, said rotor having heads with inlet openings therein, and vanes on said heads adapted to draw the air in through said inlet openings.

9. A rotor having a smooth curved side face with openings therethrough, leading from the interior of said rotor, a stator having a curved side face lying close to said face of said rotor and having openings alining with said openings in the face of said rotor, said stator having explosion chambers, receiving their charges through said openings.

10. A rotor having heads and a cylindrical face therebetween and having bucket sections and charging openings in said face, a stator having explosion chambers and a cylindrical wall lying close to said face of said rotor, and having charging openings in said wall, said stator having explosion-ports in the said wall thereof, leading directly from said explosion chambers, said explosion-ports alining centrally with said buckets in the face of said rotor.

11. A rotor having a cylindrical shell, a stator having a cylindrical wall lying close to said shell and having explosion-chambers, bucket-sections carried in the wall of said shell and alining centrally with said explosion chambers, said bucket-sections having laterally extending bucket grooves, said stator having exhaust-channels in said wall thereof, said channels alining with the ends of said bucket-grooves.

12. A rotor having a cylindrical shell with bucket-sections, mounted in the wall thereof, a stator having a cylindrical wall lying close around said shell and having inlet-openings, taking charges from the interior of said rotor, said stator having explosion-outlet ports in alinement with said bucket sections, explosion chambers directly connecting said inlet-ports with said explosion outlet-port, exhaust-channels formed in the said wall of said stator and having exhaust-ports leading from said channels.

13. A rotor having a cylindrical shell with bucket sections mounted in the wall thereof, a stator having a cylindrical wall lying close around said shell and having inlet openings taking charges from the interior of said rotor, said stator having explosion openings in alinement with said bucket sections, pipes connecting said inlet ports with said explosion openings and constituting explosion chambers, and exhaust channels in said stator carrying off the exhaust gases from said bucket sections.

In testimony whereof I have signed my name to this specification in the presence of two subscribing witnesses.

CARL BECKMANN.

Witnesses:
 JNO. M. RITTER,
 F. D. AMMEN.